United States Patent
Tamaoki

(10) Patent No.: US 6,825,636 B2
(45) Date of Patent: Nov. 30, 2004

(54) CIRCUIT AND METHOD FOR CONTROLLING STEPPING MOTOR

(75) Inventor: Tomohiro Tamaoki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/376,289

(22) Filed: Mar. 3, 2003

(65) Prior Publication Data

US 2003/0184255 A1 Oct. 2, 2003

(30) Foreign Application Priority Data

Mar. 27, 2002 (JP) ........................................ 2002-089287

(51) Int. Cl.[7] .............................................. H02P 8/00
(52) U.S. Cl. ...................... 318/685; 318/696; 318/571; 318/701; 347/19; 347/37
(58) Field of Search ................................ 318/685, 696, 318/268, 571, 701, 138, 661, 615, 572; 347/19, 37, 5; 400/279, 121; 355/235, 67, 208, 233

(56) References Cited

U.S. PATENT DOCUMENTS

| | | | | |
|---|---|---|---|---|
| 4,126,821 A | * | 11/1978 | Cannon | 318/696 |
| 4,142,140 A | * | 2/1979 | Wiesner | 318/696 |
| 4,234,830 A | * | 11/1980 | Cannon | 318/39 |
| 4,362,979 A | * | 12/1982 | Cannon | 318/603 |
| 4,603,286 A | * | 7/1986 | Sakano | 318/615 |
| 5,119,136 A | * | 6/1992 | Morikawa | 399/208 |
| 5,124,744 A | * | 6/1992 | Ogura et al. | 355/51 |
| 5,306,084 A | * | 4/1994 | Orii | 400/279 |
| 5,703,455 A | * | 12/1997 | Miyazaki | 318/685 |
| 6,335,603 B1 | * | 1/2002 | Otsuka et al. | 318/571 |
| 2003/0128002 A1 | * | 7/2003 | Kokubo et al. | 318/268 |
| 2004/0119778 A1 | * | 6/2004 | Naito | 347/37 |

FOREIGN PATENT DOCUMENTS

JP 2000-201500 7/2000

* cited by examiner

*Primary Examiner*—Paul Ip
(74) *Attorney, Agent, or Firm*—Fitzpatrick, Cella, Harper & Scinto

(57) ABSTRACT

A stepping motor control circuit sets the setting values of each defining a driving pulse period corresponding to a number of velocity steps at the time of accelerating or decelerating a stepping motor in a register, and performs calculation so as to divide each difference between driving pulse periods in between respective setting values into a predetermined number of pieces to change the driving pulse period. By doing so, this smoothly controls the acceleration and deceleration of the stepping motor without enlarging circuit scale and stepping out even if there is no excessive torque margin.

11 Claims, 5 Drawing Sheets

| STEP | SETTING VALUE | DRIVING PULSE PERIOD (mS) | DRIVING PULSE FREQUENCY (PPS) |
|---|---|---|---|
| 0 | 1040 | 10.4 | 96.2 |
| 1 | 547 | 5.47 | 182.8 |
| 2 | 299 | 2.99 | 334.4 |
| 3 | 195 | 1.95 | 512.8 |
| 4 | 139 | 1.39 | 719.4 |
| 5 | 107 | 1.07 | 934.6 |
| 6 | 91 | 0.91 | 1098.9 |
| 7 | 83 | 0.83 | 1204.8 |

CIRCUIT AND METHOD FOR CONTROLLING STEPPING MOTOR

BACKGROUND OF THE INVENTION

1. Field of the Invention

The present invention relates to a control circuit and a control method for controlling the acceleration and deceleration of a stepping motor, and in particular, to stepping motor driving pulse generation technology used to control the acceleration and deceleration of a stepping motor. In further detail, the present invention relates to a stepping motor control circuit and a stepping motor control method for an image forming apparatus such as an electrostatic recording type or electrophotographic recording type copier or printer that uses a stepping motor.

2. Related Background Art

Conventionally, for example, in an electrophotographic image forming apparatus, a DC brushless motor is used for a driving source for the conveyance of paper such as recording sheet, a driving force is transmitted from this motor to each driving part through a gear, an electromagnetic clutch, etc., and sequence operation is achieved by ON/OFF of the electromagnetic clutch.

In addition, in a high speed machine having plenty of outputs of printouts per unit time in recent years, it has also become common to have the construction of accurately controlling the conveying operation of recording sheet by using a stepping motor and by increasing the stability of high-speed paper conveyance instead of the ON/OFF of drive by an electromagnetic clutch. In order to achieve such high-speed paper conveyance, it is necessary to accelerate a stepping motor up to a predetermined velocity in a short time, and hence, for example, a stepping motor control circuit controlled by an eight-step step period setting value as shown in FIGS. 4A and 4B has been used for the acceleration and deceleration of the stepping motor.

In FIG. 4A, a register 206 controls the start and stop, and acceleration and deceleration of a motor by setting a start control signal (ON signal) controlling the start of the motor, a setting value of step change time for acceleration for setting step change timing under acceleration, a setting value of step change time for deceleration for setting step change timing under deceleration, and a change-over signal for acceleration and deceleration (ACC/DEC signal), through a CPU bus from a CPU not shown in the figure.

In FIG. 4A, a step change timer 201 for acceleration and deceleration outputs a step change timing pulse according to the value set by the setting value of step change time for acceleration during acceleration, and outputs s step change timing pulse according to the value established by the setting value of step change time for deceleration during deceleration.

Every time the above-mentioned step change timing pulse is inputted, a step control circuit 202 increases a step value during acceleration and decreases a step value during deceleration. For example, when the step change timing pulse is inputted in every 16 ms according to the setting of the setting value of step change time for acceleration, the step value is incremented as 0→1→2→3 in every 16 ms.

A selector 203 selects one value among from a step-0 setting value to a step-7 setting value according to the above-mentioned step value inputted from the step control circuit 202, and outputs the value as a driving pulse period. In the case that values of respective steps are set beforehand as shown in the table in FIG. 4B, for example, when an inputted step value is 3, the setting value is 195, and hence, the selector 203 outputs this data, 195 as the driving pulse period.

A driving pulse generation circuit 204 generates a drive pulse to drive a stepping motor 205 according to the driving pulse period (setting value) inputted from the selector 203. In the case that values of respective steps are set as shown in the table in FIG. 4B, since the inputted setting value is 1040 at step 0, the driving pulse generation circuit 204 outputs the driving pulse after taking a count of 1040 based on a 10 μs timer, and hence, the driving pulse period becomes 10.4 ms, and its frequency becomes 96.2 PPS. Similarly, since the driving pulse generation circuit 204 outputs the driving pulse after taking a count of 547 based on the 10-μs timer at step 1, the driving pulse period becomes 5.47 ms, and its frequency becomes 182.8 PPS. Similarly, since the driving pulse generation circuit 204 outputs the driving pulse after taking a count of 299 based on the 10 μs timer at step 2, the driving pulse period becomes 2.99 ms, and its frequency becomes 334.4 PPS.

In this manner, when the driving pulse is generated by the driving pulse generation circuit 204, the change of the driving pulse frequency becomes as shown in a graph in FIG. 5, which becomes large-step-formed velocity control. In the figure, a bar chart shows the frequency, and a line graph shows the period.

Nevertheless, when it was made to accelerate or decelerate a motor (stepping motor) in a small number of steps as mentioned above, the frequency change between the velocity steps was large. Therefore, there was a problem that the motor stepped out even if it was made to enlarge a torque margin of the motor. In addition, since registers corresponding to the number of setting values became necessary when it was made to increase the number of steps of the step period setting value, there was a problem that the circuit scale of the stepping motor control circuit became large because the registers increased.

SUMMARY OF THE INVENTION

The present invention aims to provide a stepping motor control circuit and a stepping motor control method that can make it possible to accelerate and decelerate a motor without stepping out even if there is no excessive torque margin by performing the control of artificially increasing the number of steps without enlarging the circuit scale of the stepping motor control circuit.

An aspect of the present invention is characterized in a stepping motor control circuit that generates a driving pulse controlling the acceleration and deceleration of a stepping motor, comprising a plurality of setting values of each defining a driving pulse period corresponding to a number of velocity steps at the time of accelerating or decelerating the above-described stepping motor, and period calculating means of finding a driving pulse period by calculating so as to divide each difference between driving pulse periods in between respective setting values into s predetermined number of pieces.

In addition, this is characterized in controlling the above-described stepping motor based on the driving pulse period found by the above-described period calculating means.

Moreover, this is characterized in the plurality of above-described setting values, each comprising a start setting value corresponding to a number of start velocity steps at the time of starting the above-described stepping motor, and a difference setting value that becomes a difference between respective velocity steps.

Another aspect of the present invention is characterized in a stepping motor control circuit that generates a driving pulse controlling the acceleration and deceleration of a stepping motor, comprising a register setting a plurality of setting values of each defining a driving pulse period corresponding to a number of velocity steps at the time of accelerating or decelerating the above-described stepping motor, and period calculating means of finding a driving pulse period by calculating so as to divide each difference between driving pulse periods in between respective setting values, set by the above-described register, into a predetermined number of pieces.

In addition, this is characterized in controlling the above-described stepping motor based on the driving pulse period found by the above-described period calculating means.

Moreover, this is characterized in the plurality of above-described setting values, each comprising a start setting value corresponding to a number of start velocity steps at the time of starting the above-described stepping motor, and a difference setting value that becomes a difference between respective velocity steps.

In addition, still another aspect of the present invention is characterized in a stepping motor control circuit that generates a driving pulse controlling the acceleration and deceleration of a stepping motor, comprising step control means of outputting a main step value and a sub step value according to a timing pulse, and period calculating means of finding a driving pulse period based on a plurality of setting values each defining a driving pulse period corresponding to a number of velocity steps at the time of accelerating or decelerating the above-described stepping motor, the above-described main step value, and the above-described sub step value.

Moreover, this is characterized in the plurality of above-described setting values, each comprising a start setting value corresponding to a number of start velocity steps at the time of starting the above-described stepping motor, and a difference setting value that becomes a difference between respective velocity steps.

In addition, the above-described period calculating means is characterized in finding a driving pulse period based on the above-described start setting value and the above-described difference setting value according to the above-described main step value and the above-described sub step value.

Furthermore, still another aspect of the present invention is characterized in a stepping motor control circuit that generates a driving pulse controlling the acceleration and deceleration of a stepping motor, comprising a step timer generating a timing pulse for step change, step control means of outputting a main step value and a sub step value according to the above-described timing pulse for step change, period calculating means of finding a driving pulse period according to the above-described main step value and sub step value based on a plurality of setting values each comprising of a start setting value, corresponding to a number of velocity steps at the time of starting the above-described stepping motor, and a difference setting value corresponding to a difference between respective velocity steps.

Moreover, the above-described step timer is characterized in generating a timing pulse for step change based on a start control signal, a setting value of step change time, and a change-over signal for acceleration and deceleration.

A still another aspect of the present invention is characterized in a stepping motor control method for generating a driving pulse controlling the acceleration and deceleration of a stepping motor, comprising a step of changing each driving pulse period so as to divide each difference between driving pulse periods in between respective setting values into a predetermined number of pieces for a plurality of setting values of each defining a driving pulse period corresponding to a number of velocity steps at the time of accelerating or decelerating the above-described stepping motor.

In addition, this is characterized in a step of controlling the above-described stepping motor based on the driving pulse period found.

Moreover, this is characterized in the plurality of above-described setting values, each comprising a start setting value corresponding to a number of start velocity steps at the time of starting the above-described stepping motor, and a difference setting value that becomes a difference between respective velocity steps.

Furthermore, still another aspect of the present invention is characterized in a stepping motor control method for generating a driving pulse controlling the acceleration and deceleration of a stepping motor, comprising a step of generating a main step value and a sub step value according to a timing pulse, and a step of finding a driving pulse period based on a plurality of setting values each defining a driving pulse period corresponding to a number of velocity steps at the time of accelerating or decelerating the above-described stepping motor, the above-described main step value, and the above-described sub step value.

Moreover, this is characterized in the plurality of above-described setting values, each comprising a start setting value corresponding to a number of velocity steps at the time of starting the above-described stepping motor, and a difference setting value that becomes a difference between respective velocity steps.

In addition, the above-described period calculating means is characterized in finding a driving pulse period based on the above-described start setting value and the above-described difference setting value according to the above-described main step value and the above-described sub step value.

Furthermore, still another aspect of the present invention is characterized in a stepping motor control method for generating a driving pulse controlling the acceleration and deceleration of a stepping motor, comprising a step of generating a timing pulse for step change, a step of generating a main step value and a sub step value according to the above-described timing pulse for step change, and a step of finding a driving pulse period according to the above-described main step value and sub step value based on a plurality of setting values each comprising a start setting value, corresponding to a number of velocity steps at the time of starting the above-described stepping motor, and a difference setting value corresponding to a difference between respective velocity steps.

In addition, the above-described step of generating a timing pulse for step change is characterized in generating a timing pulse for step change based on a start control signal, a setting value of step change time, and a change-over signal for acceleration and deceleration.

Other objects and features of the present invention will become obvious from the following description and drawings.

DESCRIPTION OF THE PREFERRED EMBODIMENTS

Hereafter, a first embodiment will be explained with referring to drawings.

Figure 3:
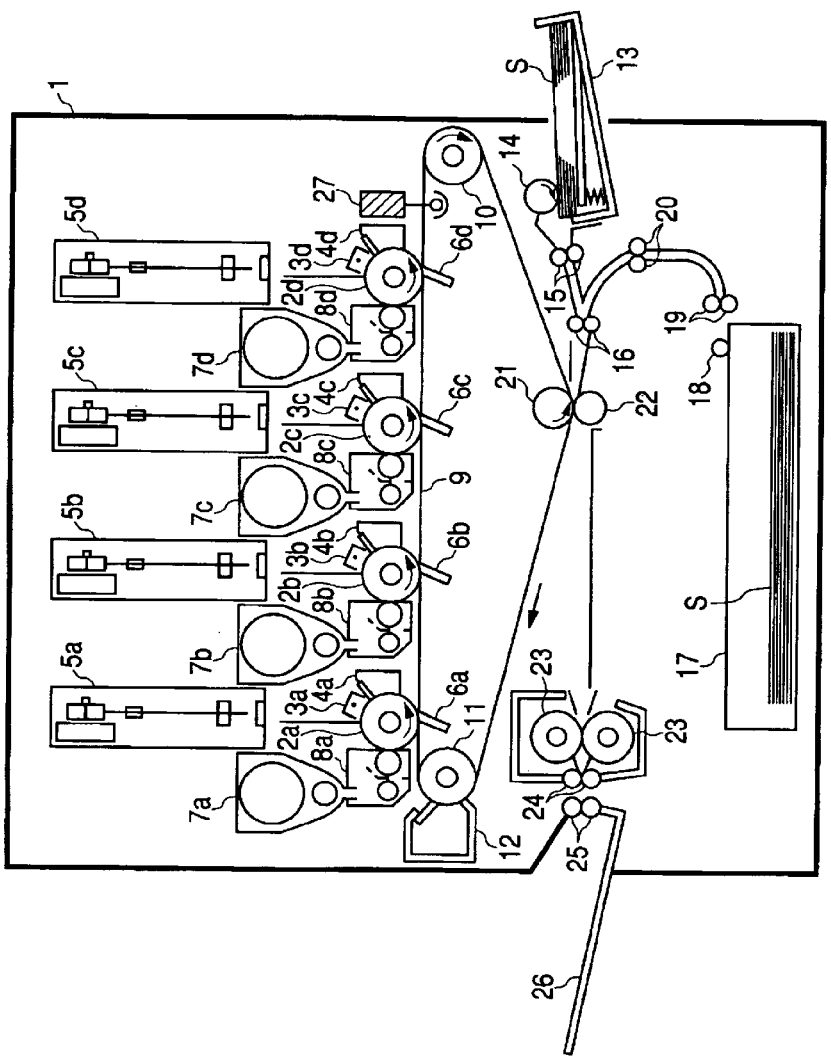
FIG. 3 is a sectional view showing the entire internal construction of an image forming apparatus using a stepping motor control circuit.

FIG. 3 is a sectional view showing the entire internal construction of an image forming apparatus using a stepping motor control circuit, and shows the schematic construction of an electrophotographic full color printer as an example of the image forming apparatus. This figure shows a printer body 1, four colors of photosensitive drums 2a to 2d, exposure electrifiers 3a to 3d, cleaners 4a to 4d, laser scanning units 5a to 5d, transfer blades 6a to 6d, developing units 7a to 7d, developing devices 8a to 8d, an intermediate transfer belt 9, rollers 10 and 11 supporting the intermediate transfer belt 9, and a cleaner 12.

Furthermore, this figure shows a manual feed tray 13 storing recording sheet S, pickup rollers 14 and 15 thereof, a registration roller 16, a sheet feeding cassette 17 storing recording sheet S, pickup rollers 18 and 19 thereof, a vertical path roller 20, a rotation roller 21, a secondary transfer roller 22, a fixing roller 23, an internal sheet discharging roller 24, a sheet discharging roller 25, a sheet discharging tray 26, and a sensor 27 detecting toner density.

In the color printer with the above-mentioned construction, each of the laser scanning units 5a to 5d having a semiconductor laser as a light source forms an electrostatic latent image for each of four colors of photosensitive drums 2a to 2d, and each of the developing devices 8a to 8d develops this electrostatic latent image. Then, respective four colors of toner images developed on these photosensitive drums 2a to 2d are integrally transferred on recording sheet in the secondary transfer roller section 22 by intermediate transfer means such as the intermediate transfer belt 9, and become a permanent image by the toner being melted through a heat fixing device comprising the fixing roller 23 and internal sheet discharging roller 24.

On the other hand, recording sheet is fed from the sheet feeding cassette 17, manual feed tray 13, or the like, and is conveyed to the secondary transfer roller 22 with the cash registration roller 16 taking registration timing. At that time, a paper conveyance section comprising the pickup rollers 18 and 19, vertical path roller 20, and registration roller 16 for feeding sheet from the sheet feeding cassette 17, and the pickup rollers 14 and 15 for feeding sheet from the manual feed tray 13 is driven respectively by one independent stepping motor (refer to reference numeral 105 in FIG. 1A) so as to achieve stable conveying operation at high speed.

FIG. 1A shows the construction of a stepping motor control circuit that controls each stepping motor. In this figure, a register 106 controls the start/stop and acceleration/deceleration of a motor by setting a start control signal (ON signal) controlling the start of the motor, a setting value of step change for acceleration that sets step change timing during acceleration, a setting value of step change time for deceleration that sets step change timing during deceleration, and a change-over signal for acceleration and deceleration (ACC/DEC signal), through a CPU bus from a CPU not shown.

A step change timer for acceleration and deceleration, 101 outputs a step change timing pulse according to the value set by the setting value of step change time for acceleration during acceleration, and outputs s step change timing pulse according to the value set by the setting value of step change time for deceleration during deceleration.

Every time the above-mentioned step change timing pulse is inputted from the step change timer for acceleration and deceleration, 101, a step control circuit 102 increases a step value in the case of acceleration and decreases a step value in the case of deceleration.

Here, the acceleration control of a motor will be described specifically. For example, when a timing pulse for step change is inputted every 2 ms by setting a setting value of step change for acceleration, a set of main step value and sub step values is outputted every 2 ms so that eight steps of sub steps may be included while the main step value is incremented by one as sets of main step value and sub step values become (0,0)→(0,1)→(0,2)→ . . . →(0,7)→(1,0)→(1,1)→(1,2)→ . . . →(1,7)→ . . . →(6,7)→(7,0). That is, the step control circuit 102 outputs a set of main step value and sub step value each time a timing pulse outputted from the timer 101 is inputted. Hereafter, to simplify explanation, the main step value and the sub step value are made a range shown by integers of 0 to 7, but, the present invention is not limited to this.

A period calculation circuit 103 calculates a driving pulse period by the following formula 1 based on a step-0 setting value and step-1 to step-7 difference setting values from the set of main step value and sub step value inputted from the step control circuit 102. Here, the step-0 setting value is a value corresponding to a period of a driving pulse at the start time of the stepping motor. Step 1 to 7 difference setting values are values corresponding to differences of driving pulse periods between respective steps (FIG. 1B). For example, the step-1 difference setting value becomes a value corresponding to a difference (4.93 ms) between a driving pulse period of 10.4 ms at a step at the start time and a driving pulse period of 5.47 ms at the next step. In addition, the setting values (step setting values and step difference setting values) shown in FIG. 1B are stored in the register 107 in the stepping motor control circuit. The register 107 is electrically connected to the period calculation circuit 103.

The calculation executed in the period calculation circuit 103 will be explained in detail. Assuming that the main step value is $M_{step}$ and the sub step value is $S_{step}$, the driving pulse period (T) is given by the following formula.

[Formula 1]

$$T = Step0 - \sum_{i=1}^{Mstep} (Stepd(i)) - \{stepd(Mstep+1) \times Sstep \div 8\}$$

Step 0: Step-0 setting value
Stepd(n): Step-n difference setting value

For example, when the main step value $M_{step}$ is 0 and the sub step value $S_{step}$ is 3 (when the step value is (0,3)), the step-0 setting value is 1040 and the step-1 difference setting value is 493 from the table in FIG. 1B, and hence, according to the calculation formula, the driving pulse period (T) becomes T=1040−(493×3/8)=855. Similarly, when $M_{step}$ is 0 and $S_{step}$ is 6 (when the step value is (0,6)), the driving pulse period (T) becomes T=1040−(493×6/8)=670.

In addition, similarly, when $M_{step}$ is 3 and $S_{step}$ is 4 (when the step value is (3, 4)), the driving pulse (T) becomes T=1040−(493+248+104)−(56×4/8)=167.

The period calculation circuit 103 outputs a value, calculated as mentioned above, as a driving pulse period. A driving pulse generation circuit 104 generates a driving pulse for driving the stepping motor 105 with taking a count based on a 10 µs timer according to the driving pulse period inputted from the selector 103. For example, when the step value is (0,3) and the calculation value of 855 is inputted from the period calculation circuit 103 as mentioned above as the driving frequency, the driving pulse generation circuit 104 outputs a driving pulse with taking a count of 855 based on the 10 µs timer. Hence, its driving pulse period becomes 8.55 ms, and its frequency becomes 117.0 PPS. In addition, similarly, when the step value is (0,6), the value of 670 is inputted to the driving pulse generation circuit 104 as described above from the period calculation circuit 103 as a driving frequency, and hence, the driving pulse generation circuit 104 outputs a driving pulse with taking a count of 670 based on the 10 µs timer. Hence, its driving pulse period becomes 6.7 ms, and its frequency becomes 149.3 PPS.

Figure 1:
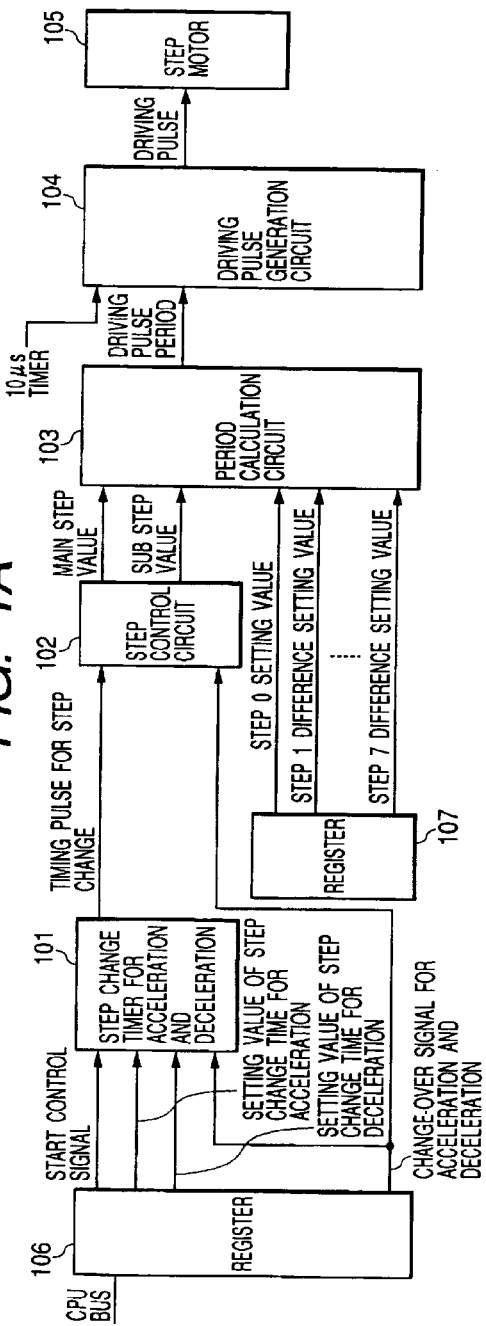
FIG. 1A is a block diagram showing the construction of a stepping motor control circuit according to a first embodiment of the present invention.
FIG. 1B is a table showing the relation among setting values, including differences (step values) at main steps 0 to 7, driving pulse frequencies, and driving pulse periods.
FIG. 1C is a table showing driving pulse frequencies and periods while step values change from (0,0) to (1,0)
Figure 2:
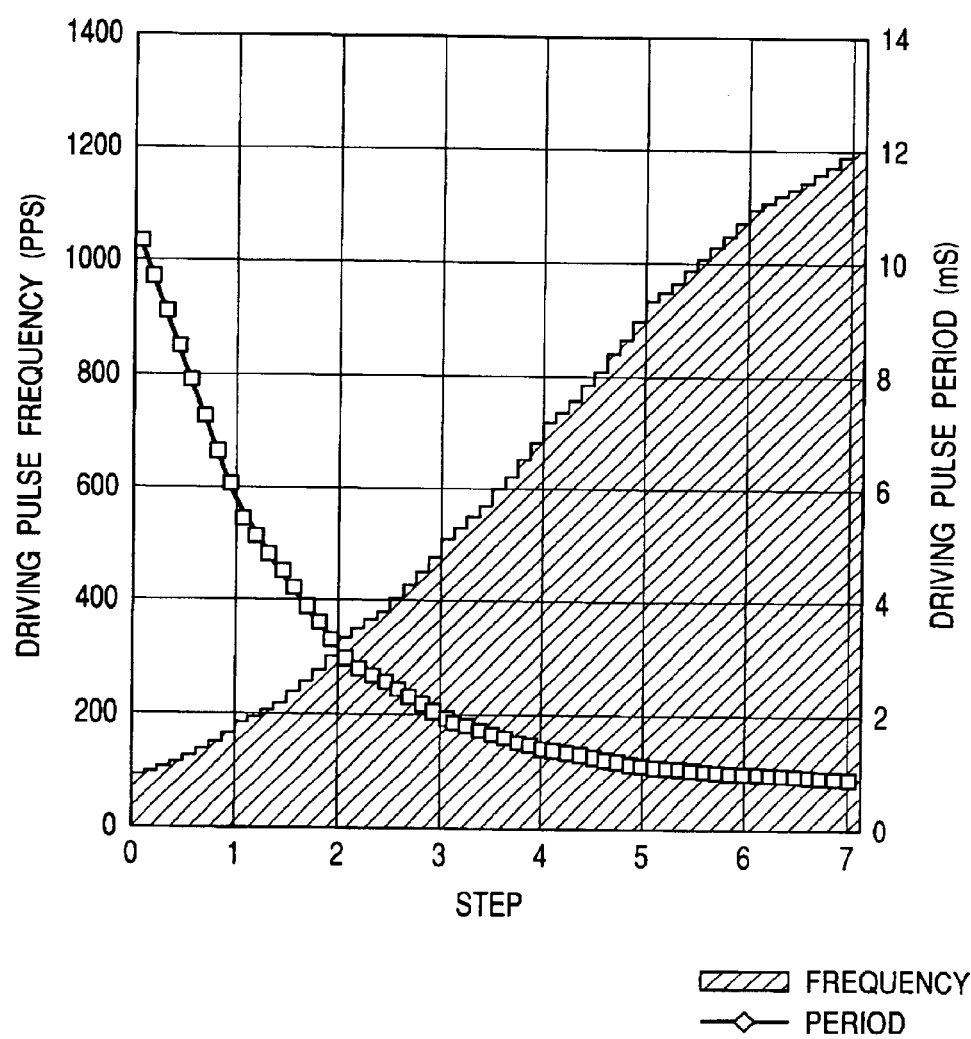
FIG. 2 is a graph showing the change of the driving pulse frequency and the period in an embodiment of the present invention.
Figures 4A, 4B:
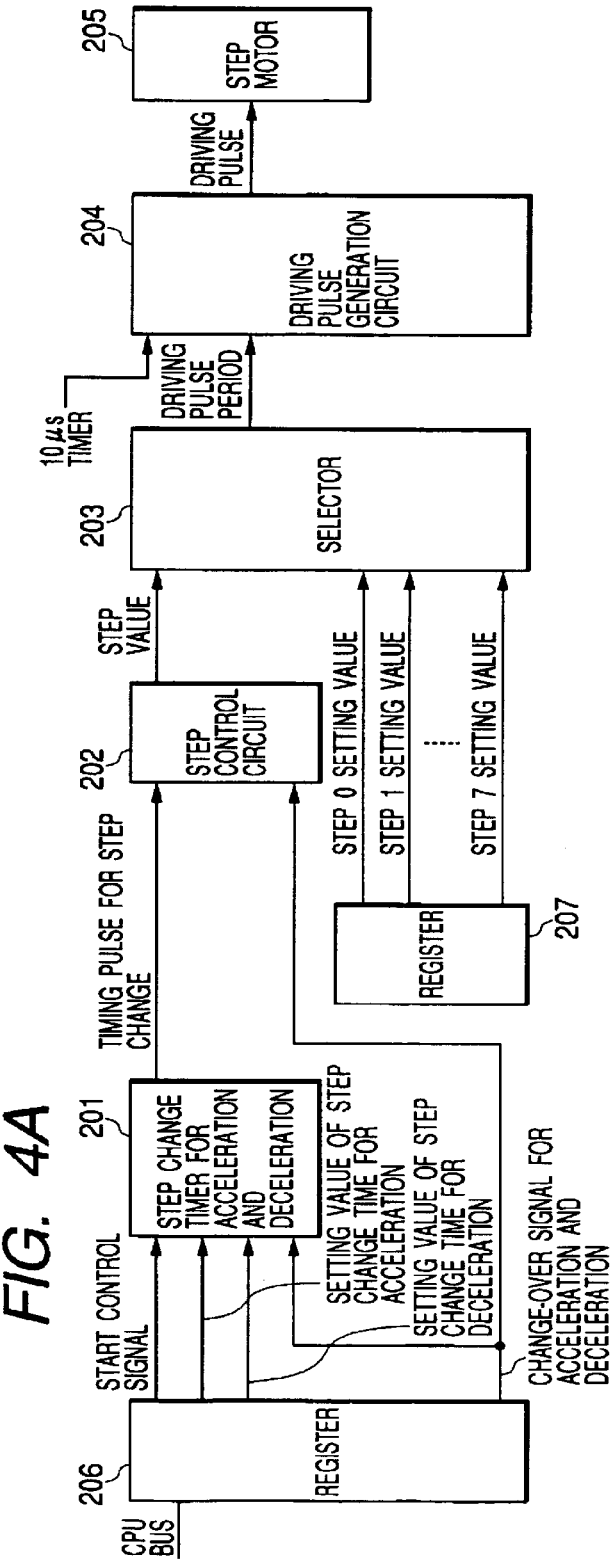
FIG. 4A is a block diagram showing the construction of a conventional stepping motor control circuit.
FIG. 4B is a table showing the relation among a setting value, a driving pulse frequency, and a driving pulse period at each step.
Figure 5:
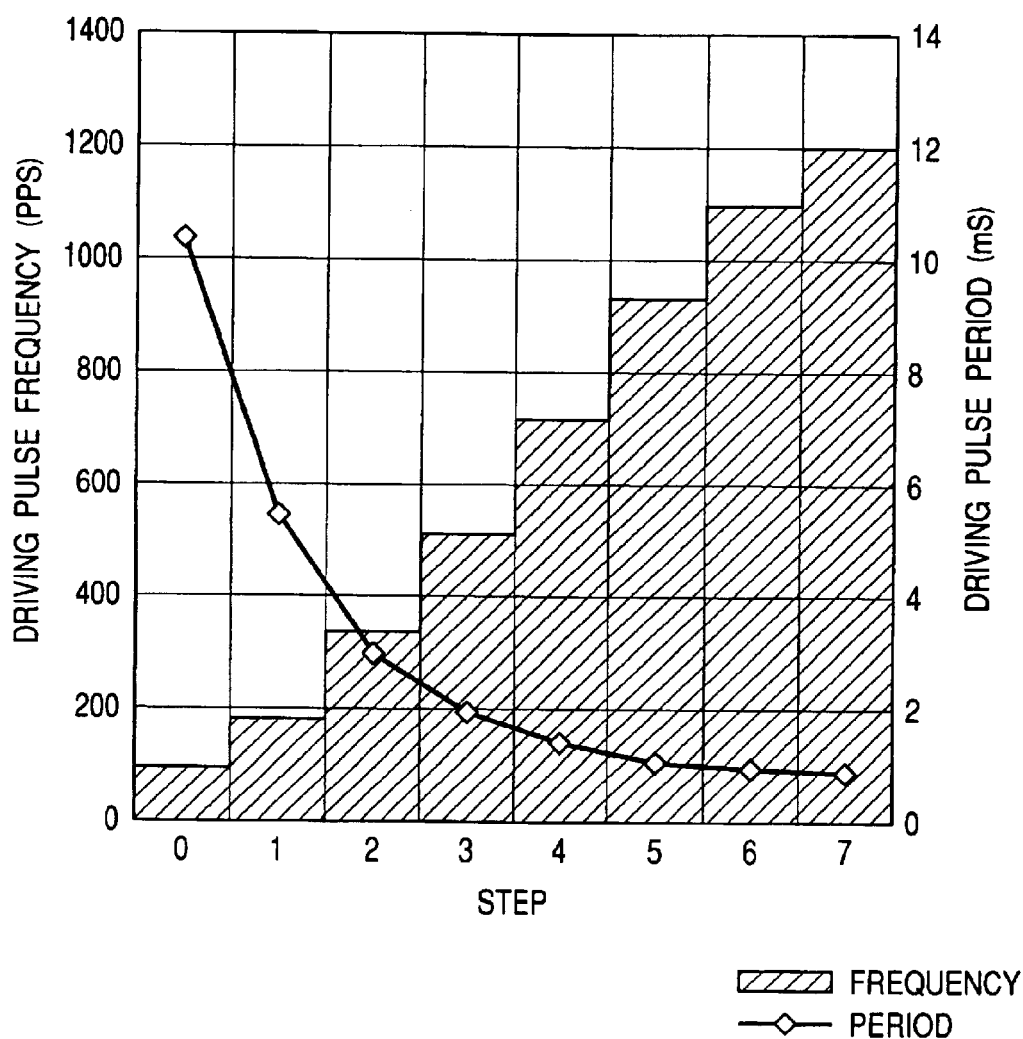
FIG. 5 is a graph showing the change of the driving pulse frequency and the period in a conventional example.

As a result, when the value at each step period is set as shown in the table of FIG. 1B, the change in the driving pulse frequency is shown in the graph of FIG. 2 (bar chart). In addition, the setting values in the table of this FIG. 1B are substantially the same as those in the table of FIG. 4B. Nevertheless, in this control, since the sub step changes in a short period along a line obtained by linearly interpolating the set periods between respective steps, it is possible to smoothly change the drive frequency with few velocity step setting values not to generate large frequency change (refer to FIG. 2).

For example, when the driving pulse frequency and the driving pulse period during the step value changing from (0,0) to (1,0) are listed, it becomes as shown in the table of FIG. 1C. Since the frequency is controlled by each spacing between the main steps being divided into and supplemented by sub steps according to the above-mentioned formula 1, the frequency smoothly changes as shown in FIG. 2. In addition, since the period setting values of steps 1–7 are set by a difference from each previous step as shown in FIG. 1 in this embodiment, there is an advantage that not only period calculation becomes simple, but also register size can be reduced in comparison with direct setting of the period setting values by using a lookup table etc.

As mentioned above, according to this embodiment since control is performed by linearly interpolating each spacing between set step periods to artificially increase the number of steps, it is possible to smoothly accelerate or decelerate a stepping motor without increasing the circuit scale of a stepping motor control circuit and stepping out even if there is no excessive torque margin.

In addition, according to this embodiment, since a period setting value of each step is set to be a difference from its previous step, not only period calculation becomes simple, but also register size (circuit scale) can be reduced in comparison with direct setting of the period setting values by using a lookup table etc.

What is claimed is:

1. A stepping motor control circuit which generates a driving pulse for accelerating or decelerating a stepping motor, comprising:
    a register in which are stored a reference set value indicating a period of a driving pulse at a time of starting said stepping motor and difference set values indicating differences between respective periods of driving pulses varying in a plurality of steps at the time of accelerating or decelerating;
    a calculating portion which, by dividing said difference set value into a predetermined number of pieces and subtracting the value obtained by said dividing from said reference set value or adding the values obtained by said dividing to said reference set value, outputs interpolating period data for interpolating between said respective periods of the driving pulses in the respective steps of the plurality of steps; and
    a driving pulse generating portion which generates the driving pulse based on said reference set value, said difference set value and said interpolating period data.

2. A stepping motor control circuit according to claim 1, wherein said driving pulse generating portion includes
    a timer which clocks a predetermined time, and
    a counter which counts output of said timer until a value of a period determined by said reference set value, said difference set value and said interpolating period data.

3. A stepping motor control circuit which generates a driving pulse for accelerating or decelerating a stepping motor comprising:
    a register in which are stored preliminarily set values for varying a frequency of the driving pulse in a step state having n-steps, said register storing set values of n number of pieces corresponding to the n-steps;
    a calculating portion which divides and interpolates respective spacing between the respective frequencies of n number of pieces based on said set values of n number of pieces, and outputs data indicating a plurality of frequencies varied in a step-state having m-steps which is larger in number than the n-steps; and
    a driving pulse generating portion which generates the driving pulse based on the data outputted from said calculating portion.

4. A stepping motor control circuit according to claim 3, wherein said register stores a reference set value corresponding to the frequency of a first step among the n-steps and difference set values of m−1 number of pieces corresponding to differences between the respective frequencies of the respective steps.

5. A stepping motor control circuit which generates driving pulses in steps of n*m number of pieces for accelerating or decelerating a stepping motor, comprising:
    a step determining portion which determines main steps of n number of pieces, and sub steps of m−1 number of pieces in respective spacing between the respective main steps, as steps for generating the driving pulse;
    a register in which are preliminarily stored data defining periods of the respective driving pulses in the main steps of n number of pieces n-steps;
    a calculating portion which calculates periods of the driving pulses in the sub steps of n*m(m−1) number of pieces based on the data of n number of pieces stored in said register; and
    a driving pulse generating portion which generates the driving pulses for driving said stepping motor, based on the periods of the driving pulses in the main steps of n number of pieces as determined from the data of n number of pieces stored in said register and the periods of the driving pulses in the sub steps of n*(m−1) number of pieces as calculated in said calculating portion.

6. A stepping motor control circuit according to claim 5, wherein the data stored in said register data includes data of the period of the driving pulse in one predetermined main step and data of n−1 number of pieces concerning the respective differences between the respective periods of the driving pulses in the respective main steps.

7. A stepping motor control circuit according to claim 5, wherein said step determining portion indicates a target step to be calculated by said calculating portion to said calculating portion as combination of an identification value of the main step and an identification value of the sub step.

8. A stepping motor control circuit according to claim 7, wherein said calculating portion calculates the period of the driving pulses, on the basis of one or more data selected in accordance with the identification value of the main step indicated by said step determining portion among the data of n number of pieces stored in said register, and the identification value of the sub step.

9. A stepping motor control circuit according to claim 6, wherein the one predetermined main step is a first main step.

10. A stepping motor control method which generates a driving pulse for accelerating or decelerating a stepping motor, comprising:

a read out step of reading out a reference set value indicating a period of a driving pulse at a time of starting said stepping motor and a difference set value indicating differences between respective periods of driving pulses varying in a plurality of steps at the time of accelerating or decelerating from a predetermined register;

a calculating step of, by dividing said difference set value into a predetermined number of pieces and subtracting the value obtained by said dividing from said reference set value or adding the values obtained by said dividing to said reference set value, outputting interpolating period data for interpolating between said respective periods of the driving pulses in the respective steps of the plurality of steps; and a driving pulse generating step of generating the driving pulse based on said reference set value, said difference set value and said interpolating period data.

11. A stepping motor control method which generates a driving pulse for accelerating or decelerating a stepping motor, comprising:

a read out step of reading out set values for varying a frequency of the driving pulse in a step state having n-steps from a predetermined register, said register storing set values of n number of pieces corresponding to the n-steps;

a calculating step of dividing and interpolating respective spacing between the respective frequencies of n number of pieces based on said set values of n number of pieces, and outputting data indicating a plurality of frequencies varied in a step-state having m-steps which is larger in number than the n-steps; and a driving pulse generating step of generating the driving pulse based on the data outputted from said calculating step.

* * * * *